Nov. 19, 1929.  L. POETON  1,736,362
TEMPLE
Filed Jan. 12, 1927
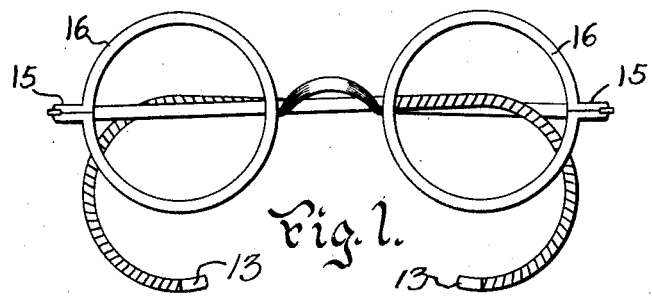
Fig.2.  Fig.3.
Fig.4.  Fig.5.
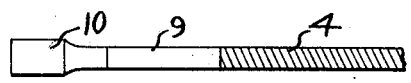
Fig.6.  Fig.7.
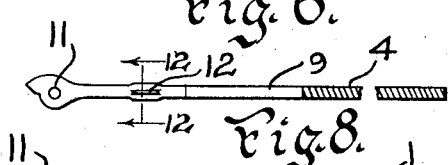
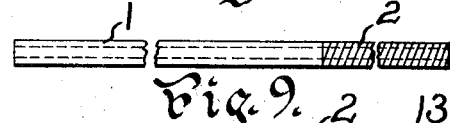
Fig.8.  Fig.9.
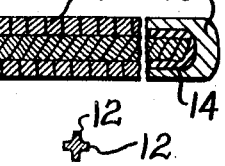
Fig.10.
Fig.11.  Fig.12.
Inventor
Lawrence Poeton.
By Harry H. Styll.
Attorney Patented Nov. 19, 1929

1,736,362

UNITED STATES PATENT OFFICE

LAWRENCE POETON, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

TEMPLE

Application filed January 12, 1927. Serial No. 160,606.

This invention relates to temples for ophthalmic mountings, such as eyeglasses, spectacles, goggles, and the like, and has particular reference to a non-metallic cable temple and to the process of making the same.

The principal object of this invention is to provide a resilient springy cable temple that will not set or break at any one particular point as has been usual in prior art cable temples.

Another object of the invention is to provide means to prevent the metallic cores of the cable temple from corroding in use.

Another object of the invention is to provide an improved cable temple which is easily adjustable to position and is soft and flexible upon the ear of the wearer.

Other objects and advantages of the invention will become apparent from the following specification taken in connection with the accompanying drawings and it will be apparent that many changes in the steps of the process and in the arrangement and construction of the parts may be made without departing from the spirit of the invention as expressed in the accompanying claims. I, therefore, do not wish to be limited to the exact details and arrangements shown, the preferred forms and steps of the process only having been shown by way of illustration.

Referring to the accompanying drawings,

Figure 1 is a front view of a pair of spectacles to which the invention has been applied;

Figure 2 is a front view of a partial arrangement illustrating one step in the process of manufacture of the temple;

Figure 3 is a view similar to Figure 2 showing a further step in the process of making the temple;

Figure 4 is a view similar to Figure 3 showing a further step in the process of making the temple;

Figure 5 shows a front view and cross section of a ferrule or tube used in the process of manufacture of the temple;

Figure 6 is a front view showing the ferrule attached to the spiral of the temple;

Figure 7 is a view similar to Figure 6 showing the attachment of the butt end piece;

Figure 8 is a front view showing the metallic core and end piece for the temple;

Figure 9 is a front view of the non-metallic covering for the temple;

Figure 10 is a longitudinal cross section through the finished temple showing the metallic and non-metallic parts in finished relationship;

Figure 11 is a front view of the finished temple;

Figure 12 is a cross section on line 12—12 of Figure 8.

Prior to my invention it has been usual to make the metallic cores for cable temples having a spiral composition covering such as celluloid or similar material of a soft or alloy metal. It has been found from experience that this soft alloy was liable to set and break at some one particular spot due to the working or flexing of the portion of the temple that goes over the ear. This soft alloy metal was usually soldered to the metallic core of the cable. If the soldered joint fell under the spiral portion of the non-metallic cable the alloy would set and break at the point of the soldered joint. If the soldered joint were located under the solid part of the non-metallic cable then the alloy would set and break at the joint between the cable portion and the non-cable portion of the non-metallic covering.

It is the object, therefore, of my invention to avoid these disadvantages of the prior art temple by providing a metallic core for the finished cable temple that will not set or break at these points or in fact at any point but will always be resilient and flexible and easily adjustable to the requirements of the wearer.

Referring to the drawings in which similar characters of reference are used throughout to denote corresponding parts it will be seen by reference to Fig. 10 that the complete cable temple comprises an outer non-metallic covering of celluloid or composition material, one portion 1 of which is solid or not spirally cut and another portion 2 of which is spirally cut in the way of the portion of the temple that goes over the ear of the wearer and an inner metallic core comprising a solid metallic butt member 3 and a spiral metallic member 4. The outer non-metallic members comprising the sections 1 and 2 are practically the same as in the prior art construction. My invention primarily relates to the core members comprising the sections 3 and 4 and to the process of making the said inner core.

I make the spiral cable portion of the core 4 by winding a double spiral consisting of the strands 5 and 6 on a mandrel 7 as shown in Fig. 2. After the spiral member 4 has thus been wound I withdraw the mandrel 7 leaving a hollow spiral tube 4 as indicated in Fig. 3. To facilitate the attachment of the metal cable member 4 to the solid metal member 3 I reduce one end of the spiral member 4 to a tapered or conical shape 8 indicated in Fig. 4. Over the conically reduced portion 8 I introduce a small tube of metal 9 shown in Fig. 5 and indicated in dotted lines in Fig. 4. After the tube 9 has been placed over the portion 8 of the cable 4 I reduce both the tube 9 and the cable 4 by swaging them, which produces the article shown in Fig. 6. To the end of the tube 9 I solder a butt piece 10 as indicated in Fig. 7. I thereafter swage the article as indicated in Fig. 7 to form the hinge joint or butt 11 of the temple and at the same time strike up the fins 12, as indicated in Fig. 8. In this operation I reduce the whole piece to the final shape for the inner core of the temple. After I have formed the piece shown in Fig. 8 I plate the same with nickel or other non-corrosive metal and then dip it in a solution of lacquer such as liquid celluloid so that corroding or rusting will be prevented. Over the inner core, as indicated, Fig. 8, I place a non-metallic tube of celluloid or other composition material having the solid portion 1 and the spirally arranged portion 2, as indicated in Fig. 9. This tube has a solid end piece 13, as indicated in Fig. 11, which forms the terminal or tip end of the ear loop portion of the cable. After the non-metallic tube has been placed over the metallic core the non-metallic material is pressed into shape of the finished article and into inter-engaging relationship with the central core, the fins 12 tending to hold the non-metallic tube in position on the metallic core. On the end of the cable is placed a little metallic tip 14 to give a finish to the metallic core and to aid in holding the non-metallic tip 13 in place thereon.

The material used for the spiral portion 4 of the metallic core is a tempered spring material very elastic and resilient in its nature and in its operation.

The temple is secured by the temple butt 11 to the end pieces 15 of the rim 16 of the spectacles shown in Fig. 1, the temple butt or joint being held in place by a pivot through the butt 11 of the temple, as is usual in devices of this kind. It will be understood, of course, that the finished temple is bent having an ear loop to fit over the ear of the wearer as is indicated in Figures 1 and 11.

The operation of the completed temple differs from that of the prior art temple in that the metallic core being resilient and springy does not have any one particular place where it will become set or break and it may be bent when properly worked upon to fit the requirements of the individual ear and after having been bent to that position it is very flexible and soft in its action. Another point in the operation of my temple is that the metallic core has no solid central core in itself as is usual in prior art metallic cores for this type of temple. This is a distinct feature from the prior art temples and is responsible for considerable of the resiliency and springiness of my improved temple which is, therefore, free from liability of breaking and displacement at particular points as has hitherto been the case.

From the foregoing it will be seen that I have provided simple, inexpensive and efficient means for overcoming the difficulties of prior art temples of this character and for obtaining a resilient, flexible and easily adjustable temple not liable to breakage in fixed weak spots as has hitherto been the case.

Having described my invention, I claim:

1. The process of making a flexible core for a temple for an ophthalmic mounting comprising winding wire on a mandrel into a spiral tube, removing the mandrel and compressing the spiral tube to reduce one end thereof in diameter, placing a recessed member over one end of the spiral tube and reducing the spiral tube and recessed member until the central opening of the spiral tube disappears and the recessed member is secured to the spiral tube.

2. The process of making a flexible cable core for a temple for an ophthalmic mounting comprising winding a spiral rod like member, reducing one end of the said member in diameter, inserting a tube over the reduced end of said member, compressing the said member and tube until they are of the same diameter, securing a butt member to the end of the tube, and shaping a portion of the butt to form a temple hinge member.

3. The process of making a flexible cable core for a temple for an ophthalmic mounting comprising winding a spiral rod like member, reducing one end of the said member in diameter, inserting a tube over the reduced end of said member, compressing the said member and tube until they are of the same diameter, and securing a butt member to the end of the tube.

4. The process of making a core for an ophthalmic mounting comprising making a hollow spiral cable section, reducing one end thereof, placing a sleeve over the reduced portion, compressing the sleeve thereon, soldering a solid portion to the sleeve, and reducing the cable and metal portions until the central opening in the cable is closed.

5. A core for a temple for an ophthalmic mounting comprising a coreless spiral metal cable section having one end tapered to a reduced diameter, and a metal member having a recessed portion over the reduced portion of the spiral member and compressed thereon and having also a solid portion extending beyond the recessed portion in a direction away from the spiral section.

6. A core for a temple for an ophthalmic mounting comprising a coreless spiral metal cable section having one end tapered to a reduced diameter, a metal member having a recessed portion over the reduced portion of the spiral member and compressed thereon and having also a solid portion extending beyond the recess portion in a direction away from the spiral section and terminating in a hinge connection associated therewith.

7. A temple for an ophthalmic mounting comprising a coreless spiral metal cable section having one end tapered to a reduced diameter, a metal member having a recessed portion over the reduced portion of the spiral member and compressed thereon and having also a solid portion extending beyond the recessed portion in a direction away from the spiral section and a non-metallic covering over a portion of the spiral and solid sections of the core.

8. A core for a temple for an ophthalmic mounting comprising a coreless spiral cable section of tempered spring material having one end tapered to a reduced diameter and a soft metal sleeve over the reduced portion of the spiral member and compressed thereon and having a solid portion extending beyond the portion over the reduced portion of the spiral section and away therefrom.

9. The process of making a flexible cable core for a temple for an ophthalmic mounting comprising winding a spiral cable member, reducing one end of said member in diameter, placing a recessed member over the reduced end of said spiral member and compressing the said spiral member and recessed member to secure the two members together.

10. The process of making a flexible cable core for a temple for an ophthalmic mounting comprising winding a spiral cable member reducing one end of said member in diameter placing a recessed member over the reduced end of said spiral member compressing the said spiral member and recessed member to secure the two members together and placing a non-metallic covering over a portion of the said spiral and solid section of the core.

LAWRENCE POETON.